Patented Apr. 30, 1940

2,198,686

UNITED STATES PATENT OFFICE 2,198,686

MANUFACTURE OF SULPHURIC ACID

William E. Watson, Nutley, N. J., assignor to General Chemical Company, New York, N. Y., a corporation of New York No Drawing. Application March 20, 1939,
Serial No. 263,051

8 Claims. (Cl. 23—172)

This invention relates to purification of sulphuric acid. Sulphuric acid solutions such as spent nitrating acid, the residual sulphuric acid of a nitric acid concentrating and drying operation, and Glover tower acid contain variable relatively small amounts of contaminating nitrogen-oxygen compound impurities generally understood in the art to be in the form of nitric acid as such or as nitrosyl sulphuric acid. The invention is more particularly directed to methods for treating or denitrating sulphuric acid solutions of the type mentioned to effect removal of such impurities.

Prior denitrating methods include blowing the sulphuric acid solution to be treated with air, steam or other gases, nitrogen impurity removal in these instances being largely mechanical. The more common and most satisfactory prior commercial method involves addition of ammonium sulphate to the sulphuric acid to be denitrated. However, use of ammonium sulphate for this purpose has certain well recognized disadvantages. The nitrogen-oxygen compound impurities in Glover tower acids and in spent nitrating acids are considered to be present as nitrosyl sulphuric acid. When using ammonium sulphate according to prior practice under the most favorable conditions, i. e., treating an impure sulphuric acid solution of $H_2SO_4$ concentration of around 75–77% and at average temperature of about 300° F., the reaction is very slow and ordinarily requires from eight to twelve hours at such temperature to go to commercially satisfactory completion. When the nitrogen-oxygen compound impurity is in the form of nitric acid as such, e. g., in the case of residual sulphuric acid of a nitric acid concentrating and drying operation, the reaction is still slower and at temperature of about 300° F., even with longer treatment or retention time and with use of excessive quantities of ammonium sulphate satisfactory results are not obtained. While in some plant operations the time element itself may be of no major importance, it will be understood that where long time intervals are required to effect desired completion of the denitrating operation it is necessary to supply substantial amount of extraneous heat to keep the temperature of the sulphuric acid solution undergoing treatment up to the most favorable temperatures for the reaction. Another important disadvantage of use of ammonium sulphate is that when concentration of the sulphuric acid solution being treated is appreciably in excess of about 75–77%, regardless of whether the nitrogen impurity is present as nitrosyl sulphuric acid or nitric acid as such, the purification reaction slows down to such an extent as to be of little or no commercial value.

The primary object of this invention is to provide an improved method for denitrating sulphuric acid solutions contaminated with nitrogen-oxygen compound impurities.

I have discovered that under certain conditions of temperature and of $H_2SO_4$ concentration of the sulphuric acid solution being denitrated, urea effects very rapid removal of nitrogen-oxygen compound impurities of the type which contaminate sulphuric acid. I have found that not only does use of urea make possible removal of nitrogen-oxygen impurities to any desired degree of denitration, but also has the advantage of substantially widening the permissible $H_2SO_3$ concentration of the sulphuric acid solutions being treated, and greatly reduces the time interval during which the acid mass being treated must be retained at treatment temperatures. Further, notwithstanding the pound for pound increased cost of urea as compared with ammonium sulphate, I find it possible to use such appreciably smaller amounts of urea that the cost of the purification operation as a whole is substantially reduced.

The invention is applicable to denitration of sulphuric acid solutions containing as impurities nitrogen-oxygen compounds in any form which may contaminate such solutions. As indicated, the three most common types of commercial sulphuric acid solutions which may be denitrated to particular advantage according to the invention are the residual sulphuric acids of nitric acid concentrating and drying operations, spent nitrating acids, and Glover tower acids. It is not with certainty known in what form the nitrogen-oxygen impurities exist in sulphuric acid solutions of these characteristics, but it is the consensus of opinion in the art that in the cases of spent nitrating acids and Glover tower acids, the nitrogen is present as nitrosyl sulphuric acid, probabilities being that any lower oxides of nitrogen are converted by sulphuric acid to nitrosyl sulphuric acid. As to the residual sulphuric acid solutions of nitric acid drying and concentrating operations, it appears that the nitrogen-oxygen impurity is present as nitric acid. The process of the invention includes purification of sulphuric acid solutions containing any amounts of nitrogen-oxygen compound impurities in whatever form such impurities may be when present in and contaminating sulphuric acid solutions.

In the practice of the invention, two of the most important control conditions are the $H_2SO_4$ concentration of the sulphuric acid solutions being treated and the temperatures at which treatment is carried out.

My investigations show that to obtain best denitration results, the $H_2SO_4$ concentration of the sulphuric acid solutions being treated should be not less than about 70% and not more than about 95%. Accordingly, it is preferred to operate with these concentrations. Although the principles of the invention are applicable and substantially improved results may be obtained when using $H_2SO_4$ concentrations as low as 60% and as high as 99.5%, the nitrogen impurity elimination reactions take place more slowly at concentrations between 60% and 70% and between 95% and 99.5%. Indications are that good results depend at least to some extent upon the presence in the solution being treated of some amount of water. The sulphuric acid solutions to be denitrated if not already of the $H_2SO_4$ concentrations indicated may be brought within the desired operating range in any suitable way as by concentration or by dilution with water.

It is noted the bulk of commercial sulphuric acid solutions which may be denitrated according to the invention, such as spent nitrating acids, Glover tower acids and residual sulphuric acid solutions of nitric acid concentrating and drying operations, are discharged from the respective processes in which such sulphuric acid solutions are formed as sought for products or by-products, at $H_2SO_4$ concentrations above 60% and in many instances within an $H_2SO_4$ concentration range of 70 to about 85%. Accordingly, it will be seen that in present commercial operations to which the process of the invention is most applicable, the sulphuric acid solutions to be denitrated are already of suitable $H_2SO_4$ concentration and no preliminary treatment of the sulphuric acid solutions to be denitrated is necessary for the purpose of bringing such solutions within desirable $H_2SO_4$ concentration ranges of the invention.

As to temperature, I have discovered that during the course of the purification reactions the temperature of the acid mass undergoing treatment should be kept at not less than 140° F. Practice of the invention shows that within reasonable limits the higher the temperature, the more effective is removal of contaminating nitrogen-oxygen impurities and the shorter the reaction time. The upper temperature limit is one more or less of economics, and practice of embodiments of the invention indicates that while temperatures above about 350° F. may be employed, temperatures above 350° F. are unnecessary and afford no particular practical advantages. As to best results with respect to substantially complete elimination of contaminating nitrogen-oxygen impurities and minimum time intervals within which the denitration operation is complete, I find temperatures of not less than about 300° F. are most desirable. It has also been discovered that satisfactory commercial results may be secured when operations are such that temperatures during the denitration operation are of the order of not less than 240° F., although at temperatures between say 240° F. and 300° F. while overall nitrogen removal is equally efficient the time required for the nitrogen elimination reaction to take place is slightly greater and becomes more prolonged as temperatures decrease.

In commercial procedures resulting in formation of sulphuric acid solutions which require denitration such as Glover tower acids and sulphuric acid solutions used in nitric acid concentrating and drying methods, operations are such that these sulphuric acid solutions are discharged from their respective processes at temperatures above about 240° F. Applying the present invention to denitration of these commercially common sulphuric acid solutions (which as indicated above have $H_2SO_4$ concentrations within the previously described limits) I find that when the initial temperature of these or other sulphuric acid solutions at the time of introduction of urea is about 240° F. or above, the nitrogen elimination reactions take place so fast that no consideration need be given to the normal temperature drop of the acid body since long before the acid body will have normally cooled to less than 140° F. the nitrogen removal reactions will have taken place. This is a marked operating advantage afforded by the invention, since by reason of the rapidity of completion of nitrogen elimination it is unnecessary, when working commercially in operations of the type mentioned, to use any extraneous heat to keep up the sulphuric acid solution being denitrated up to optimum temperatures for treatment. Other sulphuric acid solutions which may be normally at temperatures less than the treating temperatures indicated may be brought to and kept at proper temperatures by any suitable means.

The amount of urea to be used in any particular operation is dependent upon four different factors all of which are subject to fairly wide variation: namely, (1) the $H_2SO_4$ concentration of the sulphuric acid solution; (2) the temperature which is to be used to effect removal of the contaminating nitrogen compounds; (3) the nitrogen impurity content of the sulphuric acid solution; and (4) the time interval which a particular plant operation permits for completion of denitration.

These variable conditions are discussed in general as follows. Thus, other factors being the same, the more remote the $H_2SO_4$ concentration from the preferred $H_2SO_4$ concentration range, the greater is the amount of urea needed. Other factors being the same, the lower the temperature, the greater the amount of urea required. The larger the amount of contaminating nitrogen impurities contained in a given sulphuric acid solution, other factors being the same, the more urea should be used. Further, the shorter the permissible time interval within which it is desired to complete reaction, the more urea is needed. On the other hand, where the $H_2SO_4$ concentration and temperature are favorable, the amount of nitrogen-oxygen impurities is low, and it is not necessary to complete the reaction with maximum rapidity, the amount of urea needed is lessened. In view of these variable conditions, each of which in one way or another affects all of the others, as will be apparent it is not possible to specify definite directions with respect to the amount of urea to be used in all situations. However, the quantity of urea to be employed under any given set of conditions may be easily found. For example, assuming an operator is dealing with a sulphuric acid solution containing a known amount of contaminating nitrogen impurities and of known $H_2SO_4$ concentration, and it is desired to operate at a definite temperature and complete the nitrogen compound elimination within a specified time interval, the quantity of urea needed in plant operation may be determined by treating one or more samples of the particular sulphuric acid solution with urea at the projected operating temperature and noting the amount of urea required to accomplish the desired degree of denitration within the specified time interval. In development of the invention satisfactory results have been obtained where urea has been used in quantities ranging from 200 to 1000 pounds (dry basis) per 120 tons of sulphuric acid solution treated. In this work, H2SO4 concentrations varied from 60% to substantially 99.5%, and nitrogen impurity content equivalent to HNO3 varied, in the sulphuric acid solution treated, from about 0.10% to about 0.50%. In general, during time intervals ranging from about 5 to 105 minutes nitrogen-oxygen impurity content was reduced to from .004% or less to usually nil. When working under the more favorable conditions with respect to temperature and H2SO4 concentrations, impurity content was reduced to nil in from 5 to 15 minutes.

The reactions involved in the process of the invention are not fully understood nor is it understood why the results are obtained under the previously described H2SO4 concentration and temperature conditions. Experience in practice of the invention affords basis for the thought that where the nitrogen-oxygen compound to be removed is in the form of nitric acid, elimination of nitrogen is effected in accordance with either or both of the following equations:

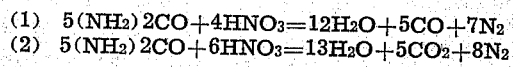

Indications are that the reaction of Equation 1 may predominate since when denitrating a sulphuric acid solution in which the nitrogen is probably all in the form of nitric acid, calculation of the amount of urea required per unit of nitric acid destroyed checks very closely with actual quantity used under favorable conditions.

On introduction of the urea into the sulphuric acid solution being treated, especially when operating within the preferred H2SO4 concentration and temperature ranges there is rapid evolution of gases and vapors from the surface of the acid mass. It seems probable this rapid evolution of gases serves to mechanically remove some nitrogen-oxygen impurity as vapor, thus supplementing chemical reaction, and when it is desired to obtain the lowest possible consumption of urea adequate provision should be made for promptly removing the gases and vapors from the surface of the acid mass as soon as evolved.

The process of the invention may be carried out as a continuous operation or batchwise, the former being preferred. The urea may, if desired, be introduced in solid form although for operating convenience a water solution of urea is recommended. One example of the invention, carried out as a continuous operation, is as follows: The sulphuric acid solution treated was the residual sulphuric acid discharged from a nitric acid concentration and drying operation and contained about 75% H2SO4 and about 0.12% HNO3. The temperature of the acid leaving the concentration and drying operation averaged about 300° F. Urea was used in the form of a 40% solution to facilitate feeding. The effluent sulphuric acid of the nitric acid concentrator was continuously run without cooling into the first of two retention tanks connected in series, and at the same time the 40% urea solution was continuously introduced into acid stream entering the first tank. The relative amounts of sulphuric acid solution and urea solution were so adjusted that over the course of the operation between 400 and 500 pounds of dry urea were used to treat 100 tons of residual sulphuric acid having an H2SO4 concentration of about 75%. Under these conditions of acid concentration and temperature, my investigations show that, as far as can be detected by known chemical tests, e. g., with diphenylamine, complete elimination of nitrogen compounds is effected in around 15 minutes. However, in a commercial-size continuous operation it is recommended, as was done in this example, that the sulphuric acid solution be run through a retention zone (in this instance two tanks connected in series) having capacity sufficient to provide for retention of all portions of the acid solution for between one and two hours in order to permit all of the sulphuric acid solution being treated sufficient time to become well mixed with urea. In the example mentioned, application of extraneous heat was unnecessary, the temperature of the solution dropped about 10-15° F., and the HNO3 content of the treated sulphuric acid solution was reduced to nil.

I claim:

1. The method for purifying sulphuric acid containing contaminating nitrogen-oxygen compound impurities which comprises treating said acid with urea to effect removal of nitrogen therefrom, said acid having an H2SO4 concentration of not less than about 60% and not more than 99.5%, and maintaining the temperature of the acid mass during the purification operation at not less than about 140° F.

2. The method for purifying sulphuric acid containing contaminating nitrogen-oxygen compound impurities which comprises treating said acid with urea to effect removal of nitrogen therefrom, said acid having an H2SO4 concentration of not less than about 70% and not more than about 95%, and maintaining the temperature of the acid mass during the purification operation at not less than about 140° F.

3. The method for purifying sulphuric acid containing contaminating nitrogen-oxygen compound impurities which comprises treating said acid with urea to effect removal of nitrogen therefrom, said acid having an H2SO4 concentration of not less than about 60% and not more than 99.5%, and maintaining the temperature of the acid mass during the purification operation not substantially less than about 240° F.

4. The method for purifying sulphuric acid containing contaminating nitrogen-oxygen compound impurities which comprises treating said acid with urea to effect removal of nitrogen therefrom, said acid having an H2SO4 concentration of not less than about 70% and not more than about 95%, and maintaining the temperature of the acid mass during the purification operation not substantially less than about 240° F.

5. The method for purifying sulphuric acid containing contaminating nitrogen-oxygen compound impurities which comprises treating said acid with urea to effect removal of nitrogen therefrom, said acid having an H2SO4 concentration of not less than about 70% and not more than about 95%, and maintaining the temperature of the acid mass during the purification operation at not less than about 300° F.

6. The method for purifying sulphuric acid containing contaminating nitrogen-oxygen compound impurities which comprises treating said acid with urea to effect removal of nitrogen therefrom, said acid having an $H_2SO_4$ concentration of not less than about 60% and not more than 99.5%, and the temperature of said acid at the time of addition of the urea being not less than about 240° F.

7. The method for purifying sulphuric acid containing contaminating nitrogen-oxygen compound impurities which comprises treating said acid with urea to effect removal of nitrogen therefrom, said acid having an $H_2SO_4$ concentration of not less than about 70% and not more than about 95%, and the temperature of said acid at the time of addition of the urea being not less than about 240° F.

8. The method for purifying sulphuric acid containing contaminating nitrogen-oxygen compound impurities which comprises treating said acid with urea to effect removal of nitrogen therefrom, said acid having an $H_2SO_4$ concentration of not less than about 70% and not more than about 95%, and the temperature of said acid at the time of addition of the urea being not less than about 300° F.

WILLIAM E. WATSON.